US012689998B2

(12) United States Patent
Zhang et al.

(10) Patent No.: US 12,689,998 B2
(45) Date of Patent: Jul. 21, 2026

(54) CONFIGURATION OF VALIDITY TIMER

(71) Applicant: ZTE Corporation, Shenzhen (CN)

(72) Inventors: Chenchen Zhang, Shenzhen (CN); Fangyu Cui, Shenzhen (CN); Nan Zhang, Shenzhen (CN); Wei Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 288 days.

(21) Appl. No.: 18/605,225

(22) Filed: Mar. 14, 2024

(65) Prior Publication Data

US 2024/0224207 A1     Jul. 4, 2024

Related U.S. Application Data

(63) Continuation of application No. PCT/CN2021/122141, filed on Sep. 30, 2021.

(51) Int. Cl.
*H04W 56/00* (2009.01)

(52) U.S. Cl.
CPC ... *H04W 56/0015* (2013.01); *H04W 56/0045* (2013.01); *H04W 56/006* (2013.01)

(58) Field of Classification Search
None
See application file for complete search history.

(56) References Cited

U.S. PATENT DOCUMENTS

| | | | |
|---|---|---|---|
| 8,674,877 B1 | 3/2014 | Mateski et al. | |
| 9,713,115 B2 | 7/2017 | Jung et al. | |
| 10,383,081 B2 | 8/2019 | Edge et al. | |
| 12,557,020 B2 * | 2/2026 | Wallentin | H04W 52/0235 |
| 12,557,053 B2 * | 2/2026 | Yuan | H04W 56/0045 |
| 2003/0016168 A1 | 1/2003 | Jandrell | |
| 2012/0062416 A1 * | 3/2012 | Syrjarinne | G01S 19/071 |
| | | | 342/357.43 |
| 2012/0194382 A1 | 8/2012 | Anderson et al. | |
| 2014/0253373 A1 | 9/2014 | Srivastava | |
| 2014/0314057 A1 * | 10/2014 | Van Phan | H04W 56/0045 |
| | | | 370/336 |
| 2014/0335889 A1 * | 11/2014 | Witych | H04W 4/023 |
| | | | 455/456.1 |
| 2015/0123844 A1 | 5/2015 | Farmer et al. | |

(Continued)

FOREIGN PATENT DOCUMENTS

| | | |
|---|---|---|
| CN | 102640529 A | 8/2012 |
| CN | 105103007 A | 11/2015 |

(Continued)

OTHER PUBLICATIONS

Office Action for Japanese Patent Application No. 2024-516895 mailed Jun. 24, 2025 with English summary, 8 pages.

(Continued)

*Primary Examiner* — Otis L Thompson, Jr.
(74) *Attorney, Agent, or Firm* — Perkins Coie

(57) ABSTRACT

Systems, methods and apparatus for achieving a synchronization between a wireless device and a network device are described. One example method includes transmitting, by the wireless device to the network device, a first message indicating a property of a validity timer associated with a synchronization information determined by the wireless device.

16 Claims, 15 Drawing Sheets

(56) References Cited

U.S. PATENT DOCUMENTS

| | | | | | |
|---|---|---|---|---|---|
| 2015/0332490 | A1* | 11/2015 | Coulmeau | ............ | G01C 23/005 |
| | | | | | 701/3 |
| 2016/0119793 | A1* | 4/2016 | Tudose | ................ | H04W 16/24 |
| | | | | | 455/447 |
| 2018/0331789 | A1* | 11/2018 | Frenger | ................ | H04L 1/1812 |
| 2021/0289463 | A1* | 9/2021 | Bi | .................... | H04W 56/0045 |
| 2022/0039146 | A1* | 2/2022 | Lei | ........................ | H04W 72/23 |
| 2023/0037533 | A1* | 2/2023 | Huang | ................. | H04L 5/0069 |
| 2023/0098798 | A1* | 3/2023 | Cheng | ................... | H04W 76/30 |
| | | | | | 370/503 |
| 2023/0099762 | A1* | 3/2023 | Khoshkholgh Dashtaki | .............. | |
| | | | | | H04W 56/001 |
| | | | | | 370/350 |
| 2023/0171724 | A1* | 6/2023 | Medles | ............ | H04W 56/0015 |
| 2023/0388952 | A1* | 11/2023 | Khoshkholgh Dashtaki | .............. | |
| | | | | | H04B 7/18513 |
| 2024/0129867 | A1* | 4/2024 | Ma | ...................... | H04B 7/18513 |
| 2024/0137885 | A1* | 4/2024 | Yuan | ................. | H04W 56/0045 |
| 2024/0259088 | A1* | 8/2024 | Rune | ................... | H04B 7/18532 |
| 2024/0292351 | A1* | 8/2024 | Frederiksen | ......... | H04B 7/1851 |
| 2024/0340074 | A1* | 10/2024 | Yan | .................... | H04W 56/0005 |
| 2024/0396784 | A1* | 11/2024 | Wen | .................... | H04L 27/2655 |

FOREIGN PATENT DOCUMENTS

| | | |
|---|---|---|
| CN | 105659674 A | 6/2016 |
| CN | 103945416 B | 6/2018 |
| WO | 2021027650 A1 | 2/2021 |

OTHER PUBLICATIONS

EPO, Extended European Search Report mailed Oct. 28, 2024 for European Patent No. 21958874.6 filed Sep. 30, 2021, 5 pages.

Moderator (Mediatek): "Summary #4 of AI 8.15.1 Enhancements to time and frequency synchronization", 3GPP Draft; R1-2108430, 3rd Generation Partnership Project (3GPP) . . . Aug. 24, 2021 (Aug. 24, 2021), XP052042626, 67 pages.

Office Action for Japanese Patent Application No. 2024-516895 mailed Nov. 21, 2025 with English summary, 8 pages.

ISA, International Search Report and Written Opinion for International Application No. PCT/CN2021/122141, mailed on Jun. 24, 2022, 6 pages.

Huawei et al., "Introduction of further NB-IoT enhancements other than EDT in TS 36.300," 3GPP TSG RAN #102, Busan, Korea, R2-1809248, May 21-25, 2018, 20 pages.

* cited by examiner

1110

1112 transmitting, by a wireless device to a network device, a first message indicating a property of a validity timer associated with a synchronization information determined by the wireless device

1120

1122 receiving, by a network device from a wireless device, a first message indicating a property of a validity timer associated with a synchronization information determined by the wireless device

1124 determining, by the network device, the property of the validity timer according the first message

1140 transmitting, by a network device to a wireless device, an information message indicating a parameter that controls a value of a validity timer associated with a synchronization information of the wireless device.

1142

CONFIGURATION OF VALIDITY TIMER

CROSS-REFERENCE TO RELATED APPLICATIONS

This application is a continuation of International Patent Application No. PCT/CN2021/122141, filed on Sep. 30, 2021, the contents of which are incorporated herein by reference in their entirety.

TECHNICAL FIELD

This document relates to systems, devices and techniques for wireless communications.

BACKGROUND

Efforts are currently underway to define next generation wireless communication networks that provide greater deployment flexibility, support for a multitude of devices and services and different technologies for efficient bandwidth utilization. For better bandwidth utilizations, various efforts are currently underway to improve the efficiency of communication between wireless device and network-side equipment.

SUMMARY

This document describes technologies that can be embodied into user devices and network equipment in a wireless network. In one example aspect, information related to validity of synchronization between a wireless device and a network device may be communicated between the wireless device and the network device.

In one example aspect, a method of wireless communications includes transmitting, by a wireless device to a network device, a first message indicating a property of a validity timer associated with a synchronization information determined by the wireless device.

In another example aspect, another method of wireless communication is disclosed. The method includes receiving, by a network device from a wireless device, a first message indicating a property of a validity timer associated with a synchronization information determined by the wireless device; and determining, by the network device, the property of the validity timer according the first message.

In another example aspect, another method of wireless communication is disclosed. The method includes receiving, by a wireless device from a network device, an information message; and determining, by the wireless device, using the information message, a validity timer indicating a validity time of a position information determined by the wireless device for synchronization with the network device.

In another example aspect, another method of wireless communication is disclosed. The method includes transmitting, by a network device to a wireless device, an information message indicating a parameter that controls a value of a validity timer associated with a synchronization information of the wireless device.

In yet another example aspect, a wireless communications apparatus comprising a processor is disclosed. The memory is configured to store processor-executable code. The processor is configured to read the code and implement a method described herein.

In another example aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

BRIEF DESCRIPTION OF THE DRAWINGS

Like reference symbols in the various drawings indicate like elements.

DETAILED DESCRIPTION

Certain features are described using the example of Fifth Generation (5G) wireless protocol. However, applicability of the disclosed techniques is not limited to only 5G wireless systems. Section headings are used in the present document for ease of presentation and do not limit scope of the disclosed embodiments to the sections in which the embodiments are disclosed.

In a non-terrestrial network (NTN), the radio frequency (RF) repeater or a base station has a large velocity, which leads to large frequency offset and timing offset in the user equipment (UE) side. One possible solution is to estimate and pre-compensate the offsets in the UE side. In order to estimate the offsets, a UE may need to perform global navigation satellite system (GNSS) positioning for its own position and perform system information block (SIB) reading for the satellite or high altitude platforms (HAPS) ephemeris and common timing advance (TA). Each GNSS positioning or SIB reading has a corresponding a validity time during which the corresponding positioning or reading is considered to be accurate enough for use. The UE may need to enter an idle state to perform a GNSS positioning and for performing SIB reading when the validity time expiry. The network may need to perform extra signaling to support UEs to estimate and modify the validity time. Besides, in order to better utilize the wireless resources, the network and a UE need to have a common understanding of when this idle state will occur for the UE This patent document provides, among other solutions, a method to provide an indication of validity time. As further described throughout the document, a communication may be performed between a wireless device (e.g., UE) and a network device (e.g., a base station or an RF repeater) to preserve accuracy of synchronization information and to provide an indication of idle mode epoch.

In the New Radio (NR) and Narrowband Internet of Things (NB-IoT) communication protocols, the transmitter and receiver need to be synchronized to interpret the transmitted wireless signals. Comparing with terrestrial network, the non-terrestrial network (NTN) brings challenges to the synchronization because of the large distance and velocity of the satellite or HAPS. In a non-terrestrial network, the timing synchronization can be achieved by timing advance giving by $$T_{TA} = (N_{TA} + N_{TA,UE-specific} + N_{TA,common} + N_{TA,offset}) \times T_c$$

Where:

$N_{TA}$ is defined as 0 for physical random access channel (PRACH) and updated based on TA Command field in msg2/msgB and a medium access control (MAC) control element (CE) TA command.

$N_{TA,UE-specific}$ is UE self-estimated TA to pre-compensate for the service link delay.

$N_{TA,common}$ is network-controlled common TA, and may include any timing offset considered necessary by the network.

$N_{TA,common}$ with value of 0 is supported.

$N_{TA,offset}$ is a fixed offset used to calculate the timing advance.

Figure 12:
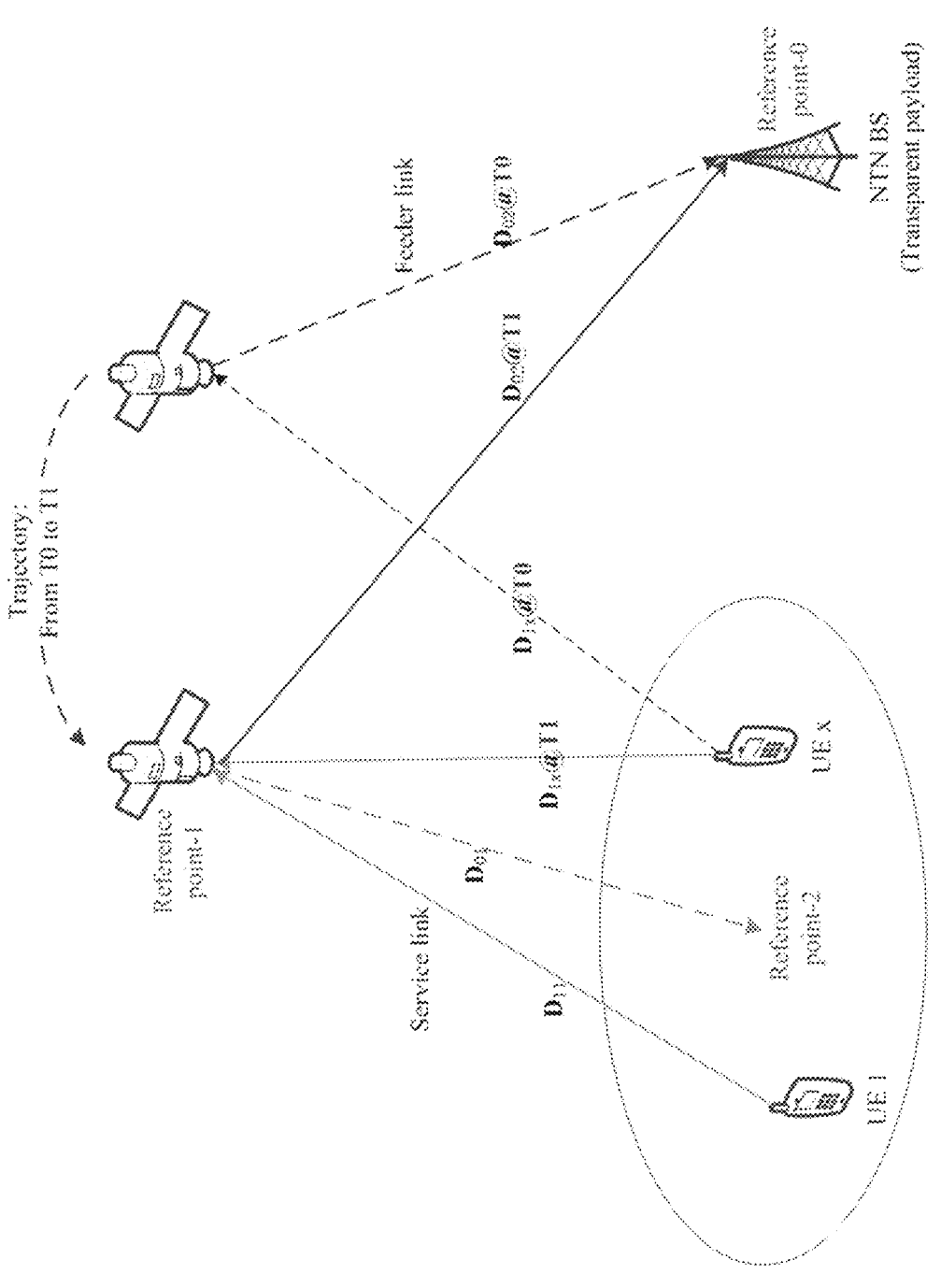
FIG. 12 shows an example of a non-terrestrial network (NTN).

An example structure of transparent NTN is illustrated in FIG. 12. Here, multiple wireless devices, labeled UE1 to UE x are depicted. On the network side, a non-terrestrial network device is depicted as a satellite or a high altitude platform. This network device may move from a first position at time T0 to a second position at time T1 and may use a feeder link to another base station, NTN BS, for connecting to a core network and other network equipment. The link between UE and satellite is service link while the link between BS and satellite is feeder link. Note that the feeder link delay is common for all UEs within the same cell. During pre-compensation, the pre-compensated TA can be divided into two parts: UE specific TA estimated by UE, and common TA indicated by BS (which may be 0). There are several mechanisms for pre-compensation. The baseline in current 3GPP discussion is as follows: The UE specific TA corresponding to service link is estimated by UE (based on UE position and satellite position) while the common TA corresponding to feeder link is estimated by BS and broadcast to UE. Obviously, at least the UE specific TA estimated by UE should be reported to BS.

In a non-terrestrial network, the common TA $T_{TA,common}$ is indicated in the system information block SIB. The SIB also contains the ephemeris of the satellite/HAPS, based on which a UE can estimate the position and velocity of the satellite/HAPS. The UE also need to know its own position, which can be obtained by GNSS positioning, to calculate the UE specific TA value $N_{TA,UE-specific}$.

However, the obtained common TA, ephemeris and GNSS position are only snapshots, and will become inaccurate with the passing of time. Each GNSS positioning or SIB reading has a validity time during which the value is usable. As for the validity of GNSS position, different UEs have different movement model and prediction capability. Therefore, the validity time is determined by UE and the network need to provide necessary support. With the expiry of the validity time, a UE needs to reacquire the related assistance information. In narrowband internet of things NB-IoT, the GNSS positioning and SIB reading cannot be performed in radio resource control RRC connected state. Therefore, the network and UE need to have a common understanding on the time window of the idle state.

To solve the above problems, and others, the following embodiments and operational cases may be implemented.

1. Embodiment-1: Report of Validity Timer

A UE needs to occasionally enter idle state to perform GNSS positioning and SIB reading. The BS needs to know the starting time of each validity timer to achieve a common understanding with the UE, which may need a reporting from the UE.

1.1 Case-1: Report of the Rest Time of Validity Timer

Figure 1:
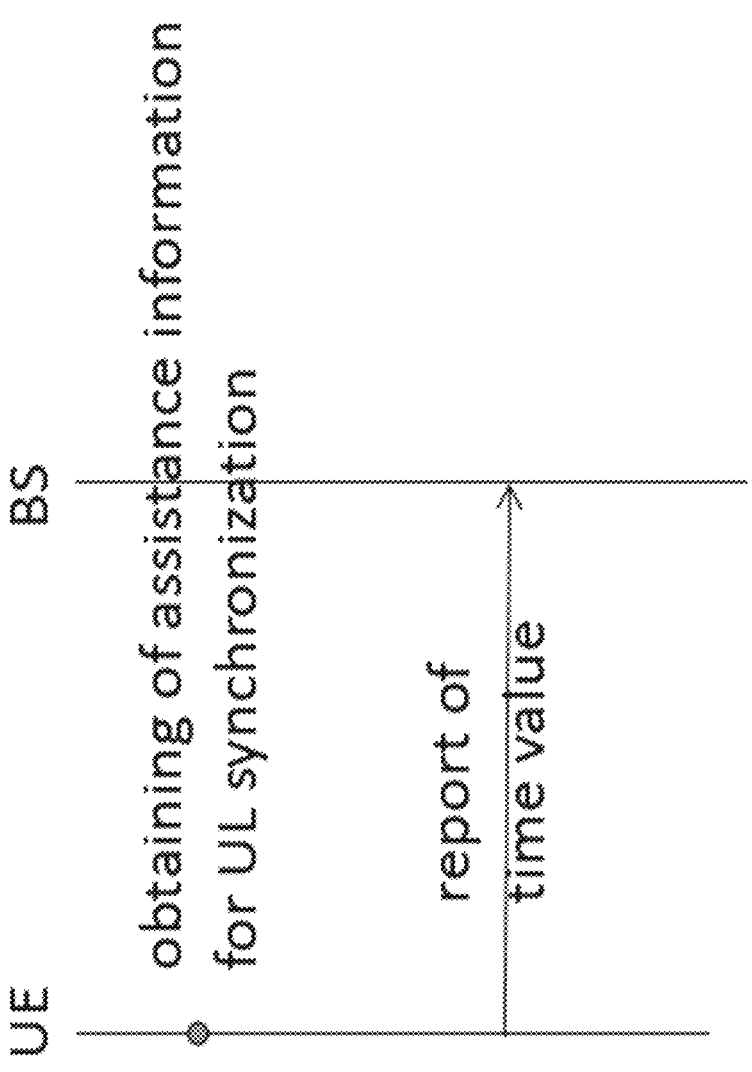
FIG. 1 shows an example of message exchanges for reporting the rest time of a validity timer.

After the obtaining of assistance information for the uplink synchronization, the UE can report a time value to the BS, as shown in FIG. 1. The operation of obtaining assistance information for the uplink synchronization can be:

1. GNSS positioning,
2. SIB reading for ephemeris,
3. SIB reading for common TA.

The obtained assistance information may be valid for a limited time, which can be represented by a validity timer. With the value or duration of the validity timer, the BS is able to derive the rest time of the validity timer based on the reported time value. The rest time may be, for example, the time during which the previously acquired values have acceptable accuracy for use in maintaining synchronization of communication between the UE and the network. The reported time value can be:

1. The time length between the starting of validity timer and the PRACH Msg1
2. The time length between the starting of validity timer and the reporting of the time value
3. The time length of the rest validity timer after the transmission of PRACH Msg1
4. The time length of the rest validity timer after the reporting of the time value
5. The time stamp of the starting of the validity timer
6. The time stamp of the expiry of the validity timer FIG. 1 shows an example of message exchanges for reporting a rest time of a validity timer. At one time instant, UE obtains assistance information for synchronization with the network. At a subsequent time, UE reports an indication of the time value for the validity timer.

Figure 2:
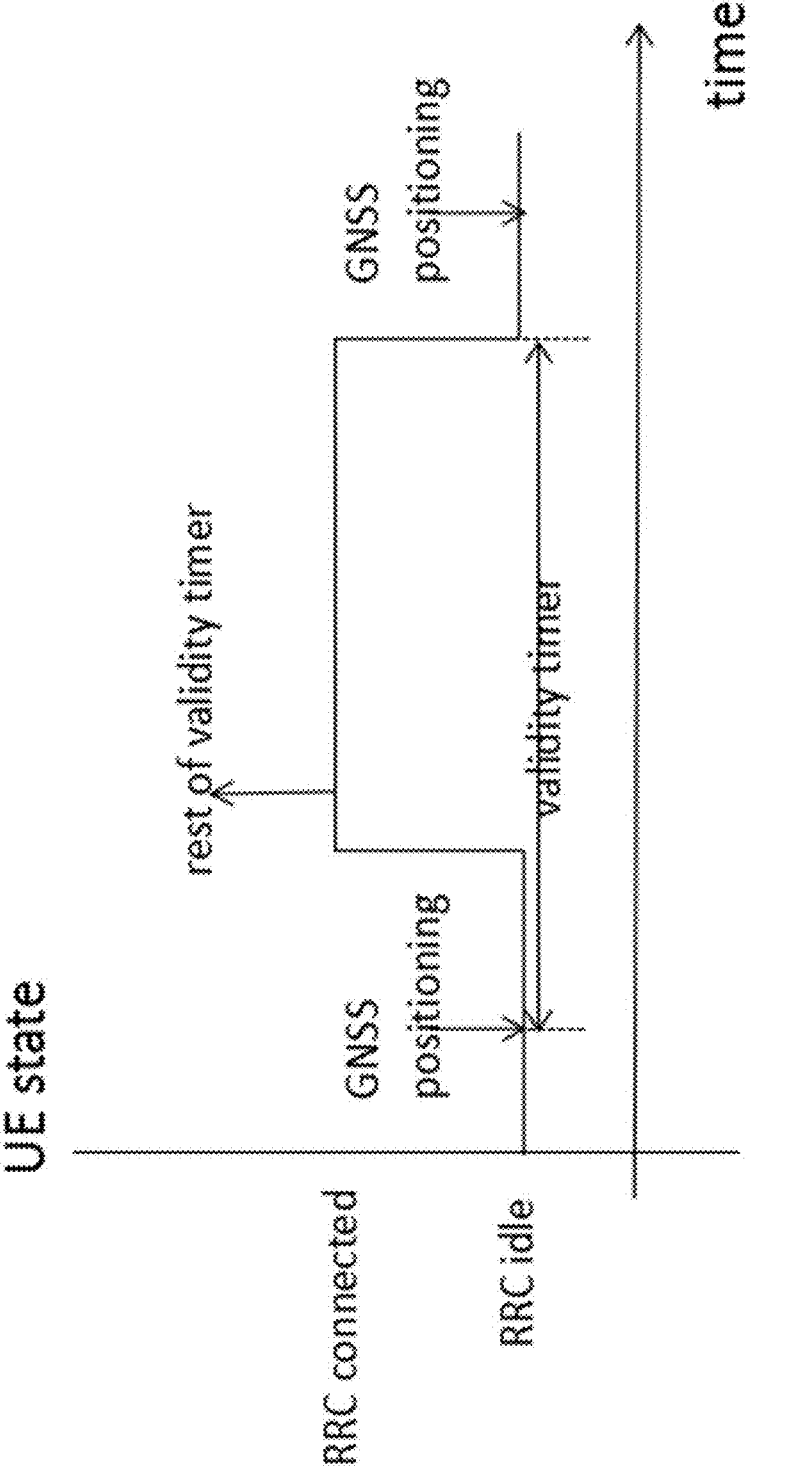
FIG. 2 shows an example timeline of a time value report for the validity timer.

An example of the time value report is shown in FIG. 2, where vertical axis represents a state of UE and the horizontal axis represents time. Starting from left, at an initial time, UE may be in a radio resource control (RRC) IDLE state in which the UE may make a positioning determination for itself. The exact time location of the GNSS positioning estimate may depend on details of the UE's GNSS acquisition capabilities. After UE position is acquired, at another time, the UE may transition to RRC CONNECTED state. The time difference may depend on UE's acquisition of system information from the network, random access attempts, and so on. Once in the RRC CONNECTED state, the UE may transmit a message reporting providing information regarding the rest time of the validity timer for synchronization. Subsequently, the UE will enter idle mode with the expiry of the validity timer to perform obtaining of assistance information. The BS can determine the starting time of the idle mode based on the reported time value.

1.2 Case-2: Report of the Waiting Time after the Expiry of Validity Timer

Figure 3:
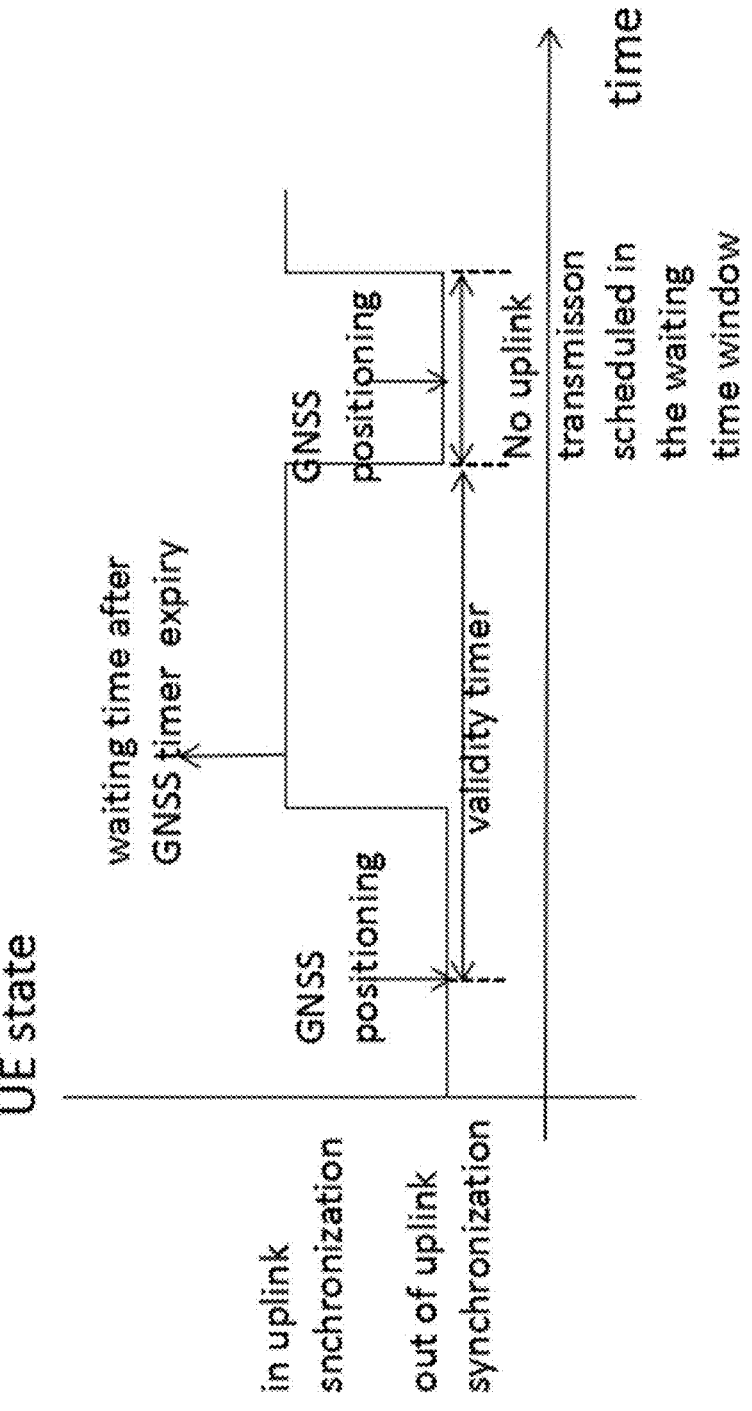
FIG. 3 shows an example timeline of a time value report for a waiting time after a validity timer has expired.

Different UEs may need different time length to perform GNSS positioning or SIB reading. Accordingly, a UE may need to indicate a time value to the network node. Based on the indicated time value, the network is able to determine a time window after the expiry of the validity timer. During the time window, the UE will refrain from performing an uplink transmission, and the network will refrain from scheduling the UE for uplink transmission as shown in FIG. 3. In the time window, the network may needn't to release the content of the UE, and the UE may be in RRC connected state or RRC idle state. With the end of the time window, the UE is regarded to be in uplink synchronization, and can be scheduled for uplink transmission.

The reported time value can be:

1. The length of the time window
2. The length between the starting of the validity timer and the end of the time window
3. The length between the reporting of the time value and the end of the time window
4. The length between the previous PRACH Msg1 and the end of the time window
5. The time stamp of the end of the time window FIG. 3 shows an example timeline of time value report for waiting time after validity timer expiry. The vertical axis represents UE state such as when UE is in synchronization with the network (e.g., RRC CONNECTED) or when the UE is out of uplink synchronization (e.g., RRC IDLE state). Along the time line in the horizontal direction, UE may achieve GNSS positioning, acquire network parameters while in the out of synchronization state, and then transmit the validity timer information after a waiting time after GNSS timer has expired. Afterword, when the validity timer expires the UE may acquire GNSS positioning again.

1.3 Case-3: Report of the Obtaining of the Assistance Information

Figure 4:
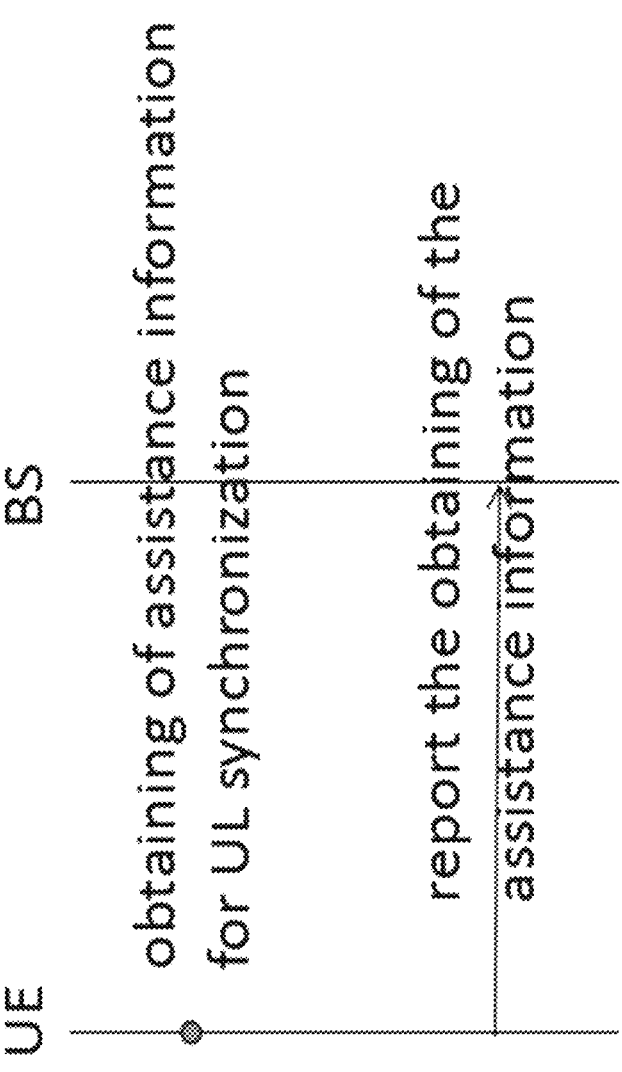
FIG. 4 shows an example of message transmission for reporting of the assistance information.

In some scenarios, the BS can determine the starting time of the validity timer without a report of a time value. For example, if the gap between GNSS positioning and PRACH Msg1 is assumed to be smaller than a constant C, the validity timer length can be set to (valid time-C). The timer starts after PRACH Msg1, and the report of the rest time value is unnecessary. However, the UE may need to report the occurring of the assistance information obtaining, as shown in FIG. 4. As depicted, the UE may obtain assistance information for synchronization and subsequently report to the network that the UE has acquired the assistance information. The BS can determine that before which packet transmission the validity timer is started.

Figure 5:
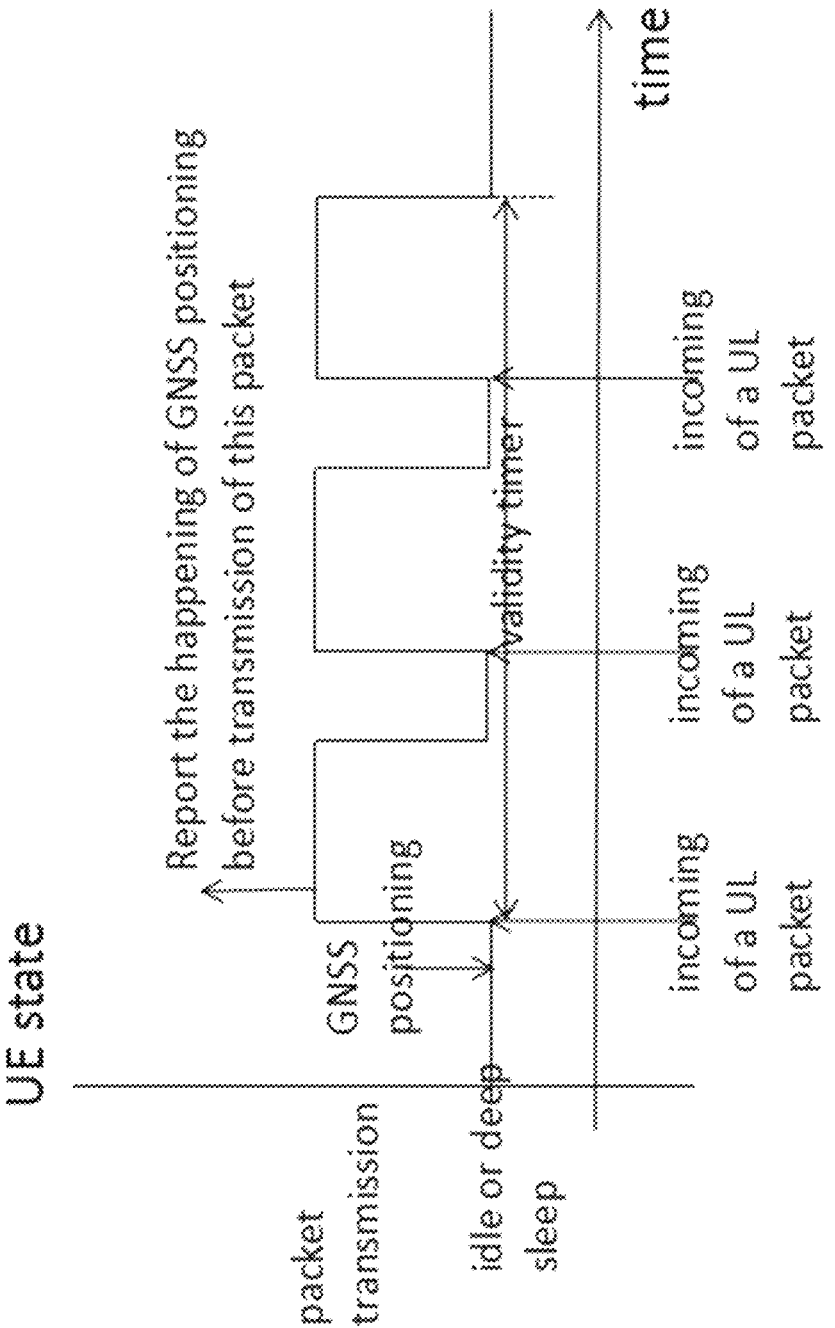
FIG. 5 shows an example of a timeline of reporting of assistance information obtaining.

An example of a timeline of the reporting is shown in FIG. 5. In the example, each packet transmission may consist of multiple switching between connected and idle state (along vertical axis). After the GNSS positioning, a bool value (Boolean) may be reported to BS, which indicates whether a GNSS positioning is performed before this packet transmission (e.g., bool 1 signals that GNSS positioning was performed and bool 0 signals that GNSS positioning was not performed).

2. Embodiment-2: Determination of GNSS Positioning Validity Timer Length

Because different UEs have different capability to perform GNSS positioning and position prediction, the validity time of each GNSS positioning may be estimated by the UE itself. Some signalings are needed to support the estimation.

2.1 Case-1: Indication of Assistance Information

The validity of a GNSS positioning is determined by the movement of the UE, the maximum tolerable timing or frequency error, and the maximum required out-of-sync probability. The network may indicate the maximum tolerable error, e.g., error budget to the UEs. The network also should be able to set the required out-of-sync probability.

Figure 6:
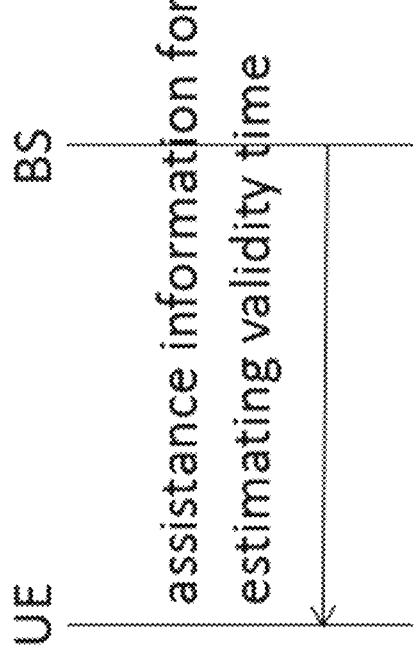
FIG. 6 shows an example of indication of assistance information.

As shown in FIG. 6, the assistance information may be the error budget, the required out-of-sync probability, or both of them. In some embodiments, the error budget may be specified in terms of positional difference. Suppose the indicated error budget is x meters in position, and required out-of-sync probability is p. It means that if the estimated UE position used in pre-compensation is within a distance of x meters of the real position, the uplink transmission is guaranteed to be in sync. Further, the network recommends the UE to ensure the in-sync state with a probability of $(1-p)$ within the reported GNSS validity time. In some embodiments, UE may maintain a movement model, for example UE may be able to predict its position at a time in future based on its previous movement. Suppose after one GNSS positioning, the UE's position prediction error has a probability of p to exceed x meters in the t-th second. Then the GNSS validity time will be regarded as t seconds. For example, suppose p=0 and the UE's maximal velocity is v, the GNSS validity time can be regarded as x/v.

2.2 Case-2: Report of Validity Time

When the UE estimates the GNSS validity time, it may report the time to the network, to achieve common understanding on the occurring of idle state.

Figure 7:
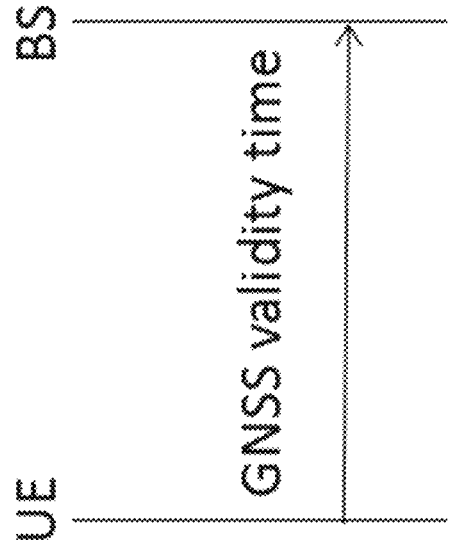
FIG. 7 shows an example of reporting a validity time for GNSS.

FIG. 7 shows an example of reporting of GNSS validity time.

2.3 Case-3: Adjustment of Error Budget

The total error budget may be shared for the errors from GNSS positioning, ephemeris, and common TA. The UE may be able to recommend the network to adjust the error budget for power saving. The indication maybe error budget value, adjustment value, or adjustment direction.

Figure 8:
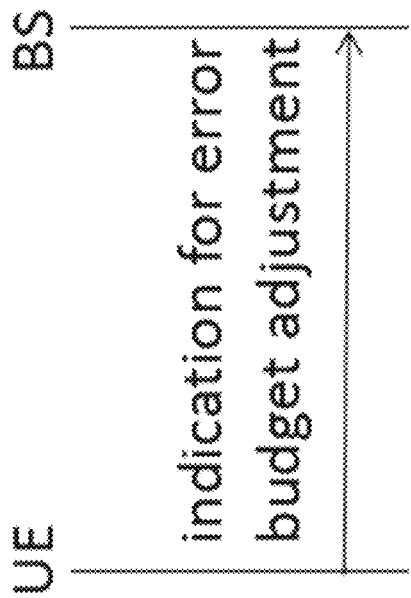
FIG. 8 shows an example of indication of adjustment of error budget.

FIG. 8 shows an example of indication for adjustment of error budget.

3. Embodiment-3: Combination of Open Loop and Closed Loop TA Control Mechanisms In NTN, open loop TA control is generally adopted in addition to traditional closed loop TA control to handle the large and fast drifting propagation delay. There could be two types of open loop TA control:

(1) Autonomous estimation of UE-specific service link TA $N_{TA,UE\text{-}specific}$ at UE side. The geometric based estimation method is generally used, which will utilize the ephemeris information of satellite, which is broadcast by BS, and GNSS information, which is obtained at UE. The service link TA can be calculated based on the distance between satellite and UE.

(2) Autonomous adjustment of common TA $N_{TA,common}$ at UE side. Due to high mobility of satellite, the TA could drift fast. To save signaling overhead, the common TA drift rates can be indicated to let UE autonomously adjust common TA.

Note that there will be accumulated residual TA error after the open loop TA control. Hence, traditional closed loop TA control can be adopted to mitigate the residual error. And the accumulated closed loop TA can be denoted by $N_{TA,closedloop}$.

When calculating the overall TA for UL synchronization, the open loop TA and closed loop TA may be combined.

Directly adding the accumulated closed loop TA command and open loop UE autonomous TA is the simplest way, e.g., $N_{TA,combination} = N_{TA,common} + N_{TA,UE-specific} + N_{TA}$. However, in direct adding method, double correction may happen when the parameters that affect open loop control (including at least common TA, ephemeris, and GNSS position) are updated. For example, assume that the residual TA error due to GNSS error in estimation of $N_{TA,UE-specific}$ is $\Delta TA$ and the accumulated closed loop TA $N_{TA}$ compensates this error. Then, when GNSS information is updated, the error $\Delta TA$ will be corrected in both open loop TA control and closed loop TA control and duplicated correction happens between $N_{TA,UE-specific}$ and $N_{TA}$. With duplicated correction, there will be a TA jump for overall TA, which increases overall error.

In order to avoid the duplicated correction, the overcompensated part in closed loop can be subtracted when the parameters related to open loop control is updated. That is, (1) When a new GNSS fix is applied, UE could subtract the difference between UE specific TAs derived based on new parameters and old parameters from the accumulative closed loop TA. That is, $N_{TA,new} = N_{TA,old} - (N_{TA,UE-specific,new} - N_{TA,UE-specific,old})$, where $N_{TA,new}$ and $N_{TA,old}$ denote the accumulated closed loop TA after applying new GNSS fix and before applying new GNSS fix, respectively, and $N_{TA,UE-specific,new}$ and $N_{TA,UE-specific,old}$ denote the UE-specific TA estimated by UE based on new GNSS fix and old GNSS fix, respectively.

(2) When new ephemeris information is applied, UE could subtract the difference between UE specific TAs derived based on new parameters and old parameters from the accumulative closed loop TA. That is, $N_{TA,new} = N_{TA,old} - (N_{TA,UE-specific,new} - N_{TA,UE-specific,old})$, where $N_{TA,new}$ and $N_{TA,old}$ denote the accumulated closed loop TA after applying new ephemeris information and before applying new ephemeris information, respectively, and $N_{TA,UE-specific,new}$ and $N_{TA,UE-specific,old}$ denote the UE-specific TA estimated by UE based on new ephemeris information and old ephemeris information, respectively.

(3) When new common TA parameters are applied, UE could subtract the difference between common TAs derived based on new parameters and old parameters from the accumulative closed loop TA. That is, $N_{TA,new} = N_{TA,old} - (N_{TA,common,new} - N_{TA,common,old})$, where $N_{TA,new}$ and $N_{TA,old}$ denote the accumulated closed loop TA after applying new common TA parameters and before applying new common TA parameters, respectively, and $N_{TA,common,new}$ and $N_{TA,common,old}$ denote the common TA derived by UE based on new common TA parameters and old common TA parameters, respectively.

Figure 9:
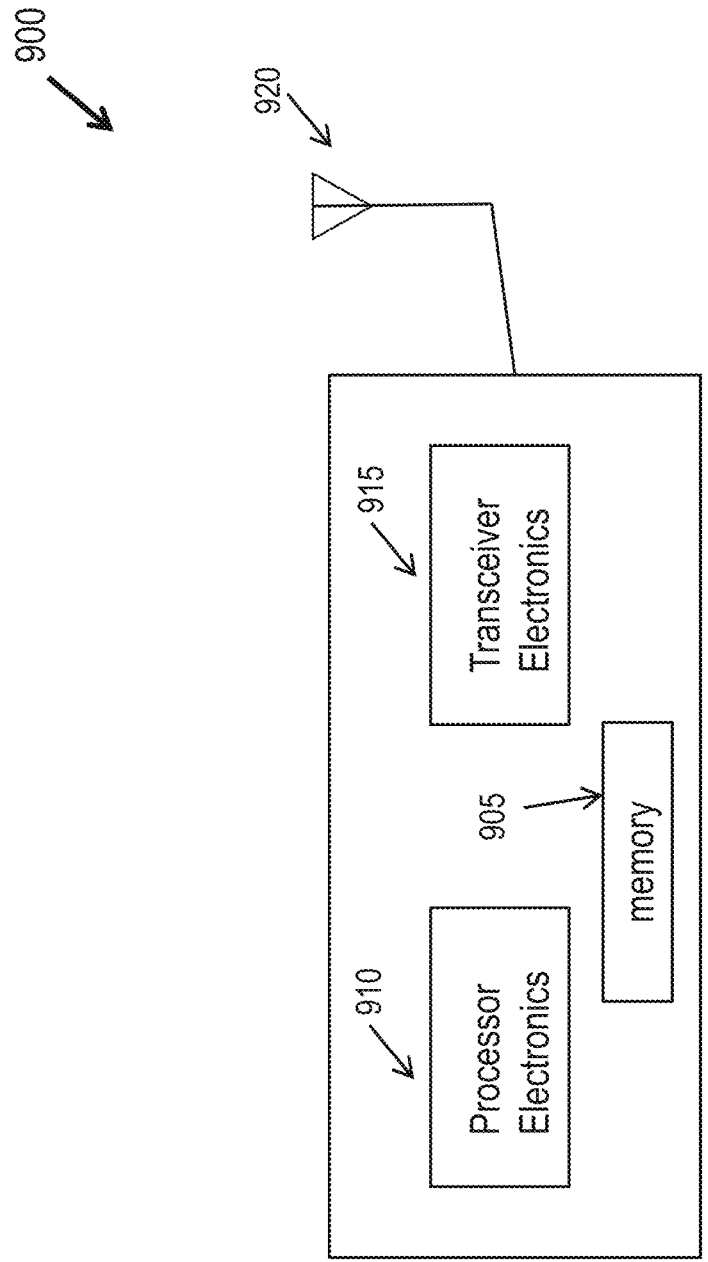
FIG. 9 is a block diagram of an example of a wireless communication apparatus.

FIG. 9 is a block diagram of an example of a wireless communication apparatus 900. The apparatus 900 includes a processor 910 that may be configured to implement one of the techniques described herein, transceiver electronics 915 that is able to transmit signals or receive signals using the antenna(s) 920, and one or more memories 905 (which may be optional and may be internal to the processor) that may be used to store instructions executable by the processor 910 and/or data storage. The processor 910 may be configured to implement the techniques described in the present document and the signals and messages may be transmitted or received using the transceiver electronics 915 and antenna(s) 920.

Figure 10:
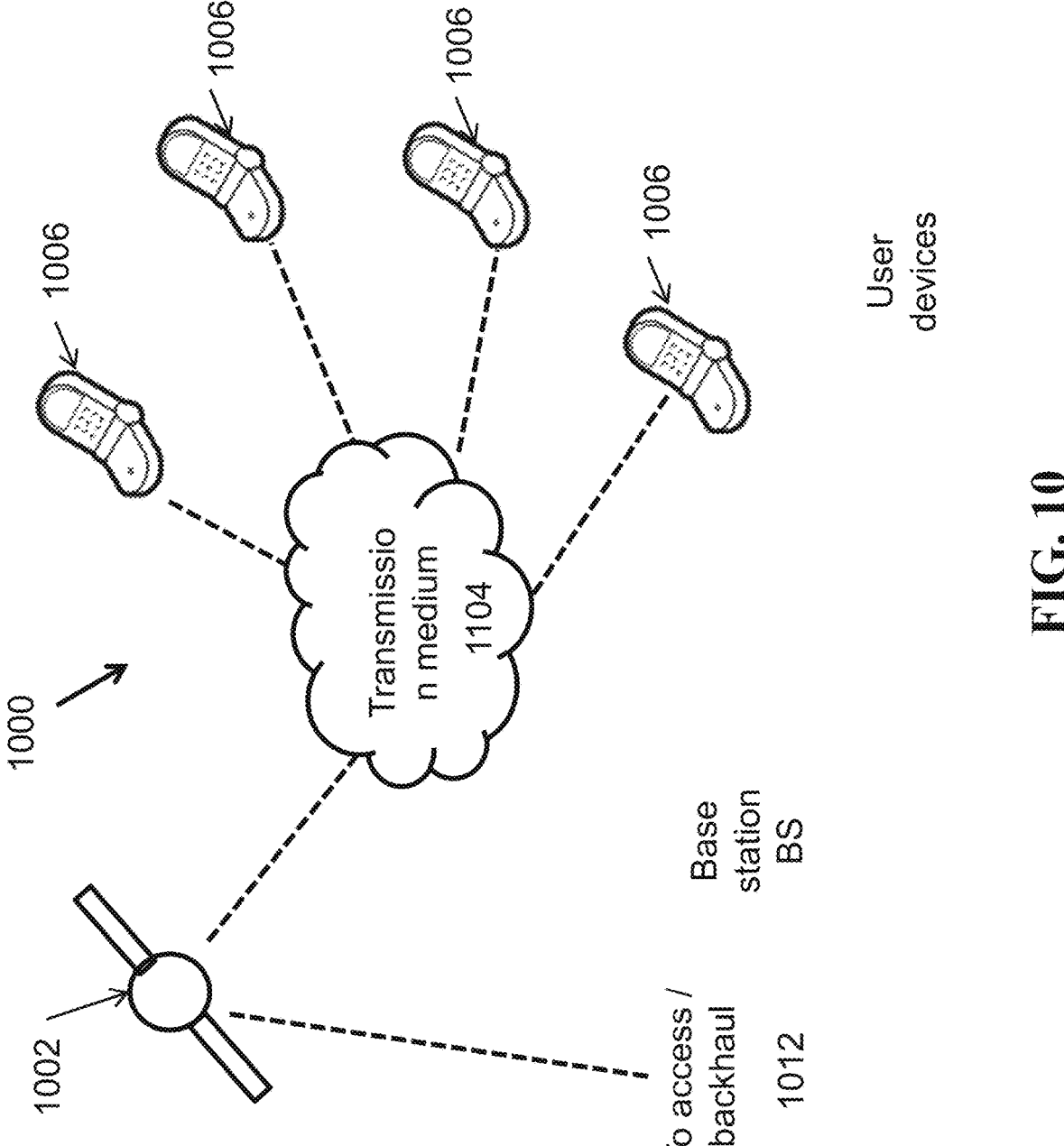
FIG. 10 shows an example wireless communications network.

FIG. 10 shows an example wireless communications network 1000. The network 1000 includes a base station BS 1002 and multiple user devices 1006 being able to communicate with each other over a transmission medium 1004. The transmissions from the BS 1002 to the devices 1006 are generally called downlink or downstream transmissions. The transmissions from the devices 1006 to the BS 1002 are generally called uplink or upstream transmissions. The transmission medium 1004 typically is wireless (air) medium. The BS 1002 may also be communicatively coupled with other base stations or other equipment in the network via a backhaul or an access network connection 1012. The BS 1002 may be, for example, a non-terrestrial BS such as a satellite or an HAP.

Some preferred embodiments may implement the below-listed solutions.

The following solutions may be implemented by a UE, e.g., as further disclosed in Section 1 of the present document.

Figure 11A:
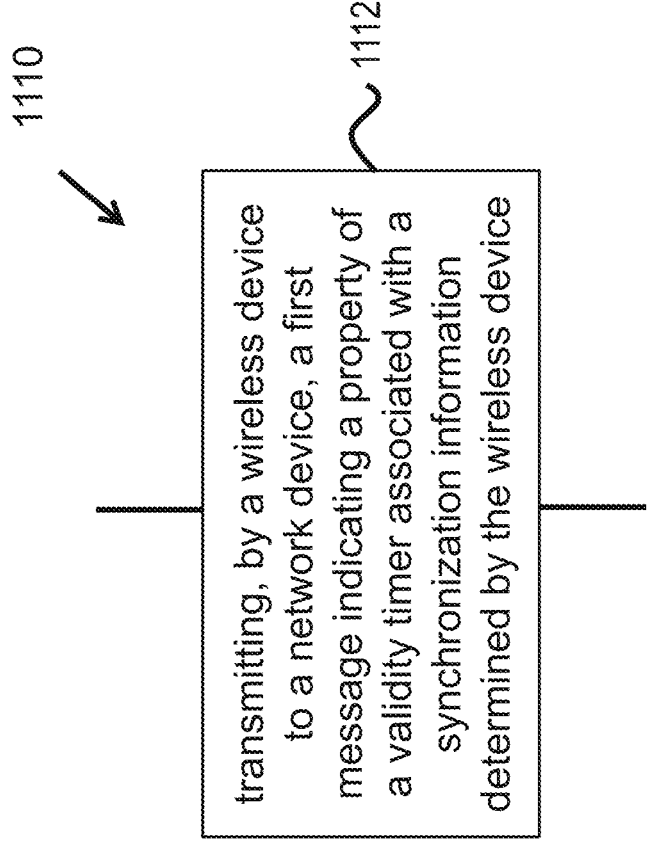
FIGS. 11A-11D show flowcharts of wireless communication methods.

1. A method of wireless communication (e.g., method 1110 depicted in FIG. 11A), comprising: transmitting (1102), by a wireless device to a network device, a first message indicating a property of a validity timer associated with a synchronization information determined by the wireless device.

2. The method of solution 1, wherein the first message is transmitted after the wireless device acquires the synchronization information.

3. The method of any of solutions 1-2, wherein the synchronization information is acquired by the wireless device by positioning data of the wireless device.

4. The method of any of solutions 1-2, wherein the synchronization information is acquired based on a second message from the network device comprising assistance information. In some embodiments, the second message is an RRC message. Alternatively, or in addition, the second message may be a MAC layer transmission such as a MAC CE.

5. The method of solution 4, wherein the assistance information includes a positioning information, or an ephemeris information of the network device, or a common timing advance information transmitted by the network device.

6. The method of any of solutions 1-5, wherein the first message includes a time value. The time value may provide a property of the validity timer as below.

7. The method of solution 6, wherein the time value indicates one of: (a) a time length between a starting of the validity timer and a random access transmission by the wireless device, (b) a time length between the starting of the validity timer and transmission of the information, (c) a time length of a rest time of the validity timer after the random access transmission, (d) a time length of the rest time of the validity timer after transmitting the information, (e) a time stamp of a starting time of the validity timer, (f) a time stamp of an expiry time of the validity timer, or (g) a time length of the validity timer.

8. The method of any of solutions 1-5, wherein the first message comprises indicating a time at which the wireless device acquires assistance information for synchronization with the network device.

9. The method of solution 8, wherein the assistance information comprises ephemeris information of the network device or a common timing advance parameter from the network device or a global navigation satellite system, GNSS, positioning information of the wireless device.

10. The method of any of above solutions, wherein the time value indicates one of: (1) a length of the time window, (2) a length between a starting time of the validity timer and an end time of the time window, (3) a length between transmission of the first message and the end time of the time window, (4) a length between a previous Msg1 transmission and the end time of the time window, (5) a time stamp value indicating the end of the time window, or (6) a time stamp value indicating the start of the time window.

11. The method of any of above solutions, wherein the property of the validity timer comprises a duration of the validity timer.

The following solutions may be implemented by a network device, e.g., a BS as further disclosed in Section 1 of the present document.

Figure 11B:
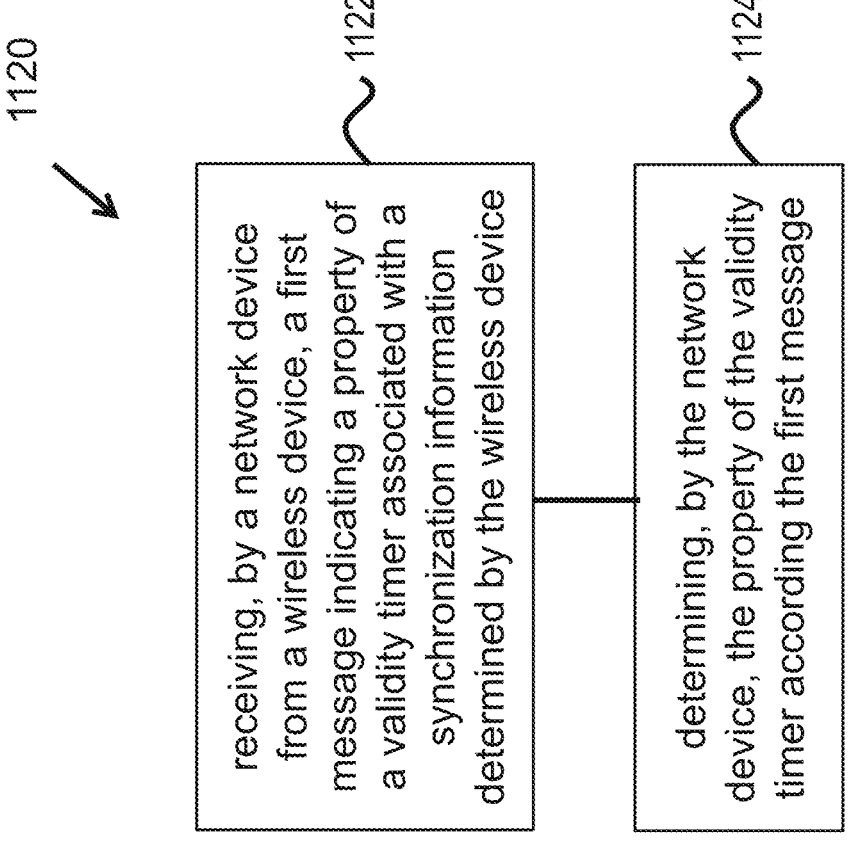

12. A method of wireless communication (e.g., method 1120 depicted in FIG. 11B), comprising: receiving (1122), by a network device from a wireless device, a first message indicating a property of a validity timer associated with a synchronization information determined by the wireless device; and determining (1124), by the network device, the property of the validity timer according the first message.

13. The method of solution 12, wherein the first message is transmitted by the wireless device after the wireless device acquires the synchronization information.

14. The method of any of solutions 12-13, wherein the synchronization information is acquired by the wireless device by positioning data of the wireless device.

15. The method of any of solutions 12-13, further including transmitting a second message from the network device to the wireless device, wherein the second message includes wherein the second message includes assistance information usable by the wireless device to acquire the synchronization information.

16. The method of solution 15, wherein the assistance information includes a positioning information, or an ephemeris information of the network device, or a common timing advance information transmitted by the network device.

17. The method of any of solutions 12-16, wherein the first message includes a time value.

18. The method of solution 17, wherein the time value indicates one of: (a) a time length between a starting of the validity timer and a random access transmission by the wireless device, (b) a time length between the starting of the validity timer and transmission of the information, (c) a time length of a rest time of the validity timer after the random access transmission, (d) a time length of the rest time of the validity timer after transmitting the information, (e) a time stamp of a starting time of the validity timer, or (f) a time stamp of an expiry time of the validity timer.

19. The method of any of solutions 12-16, wherein the first message comprises a time at which the wireless device acquires assistance information for synchronization with the network device.

20. The method of solution 19, wherein the assistance information comprises ephemeris information of the network device or a common timing advance parameter from the network device or a global navigation satellite system, GNSS, positioning information of the wireless device.

21. The method of any of solutions 12-20, wherein the property of the validity timer comprises a starting time, an ending time of the validity timer, or a time window after expiry of the validity timer during which the network device is not to schedule a transmission from the wireless device to the network device.

22. The method of any of solutions 12-21, wherein the property of the validity timer comprises a duration of the validity timer.

The following solutions may be implemented by a UE, e.g., as further disclosed in Section 2 of the present document.

Figure 11C:
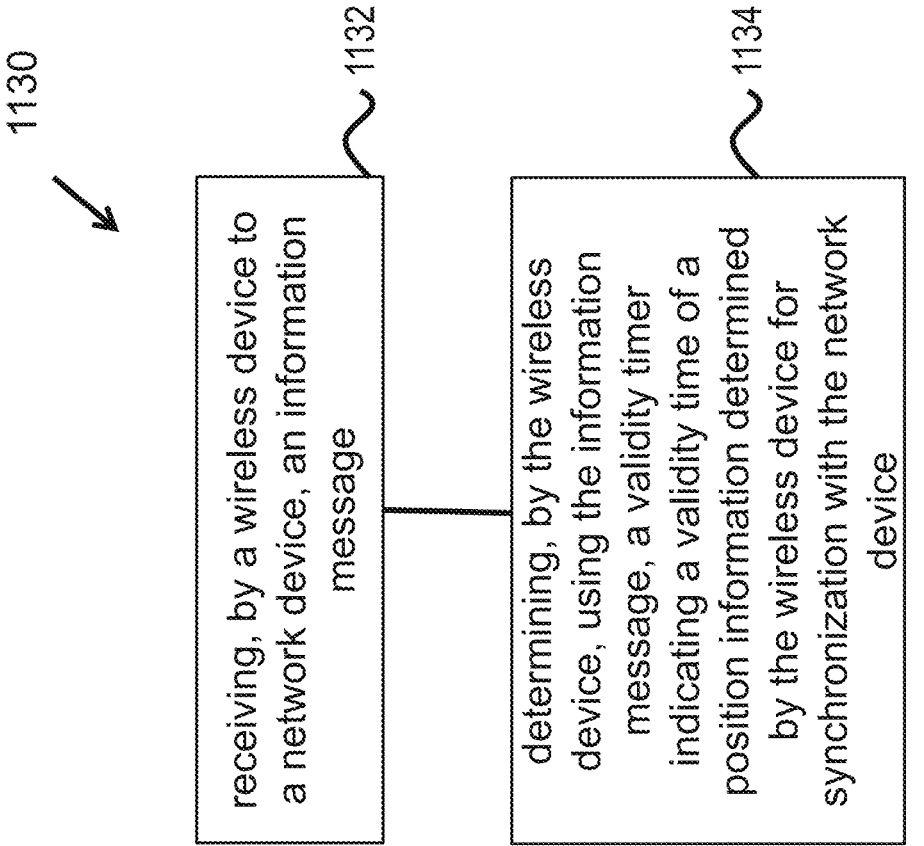

23. A method of wireless communication (e.g., method 1130 depicted in FIG. 11C), comprising: receiving (1132), by a wireless device from a network device, an information message; and determining (1134), by the wireless device, using the information message, a validity timer indicating a validity time of a position information determined by the wireless device for synchronization with the network device. Here, the validity time or the rest time may refer to a time duration in which the synchronization information is accurate enough to carry on communication between the wireless device and the network device at a performance level above a threshold (e.g., error rate below an error threshold).

24. The method of solution 23, wherein the information message indicates an error budget for communication between the wireless device and the network device.

25. The method of solution 23-24, wherein the information message indicates a probability that the network device and the wireless device will fall out of synchronization.

26. The method of any of solutions 23-25, further including: transmitting, by the wireless device, a message indicative of the validity timer.

27. The method of any of solutions 23-26, further including: transmitting, by the wireless device, a recommended error budget for communication between the wireless device and the network device.

28. The method of solution 27, wherein the recommended error budget for communication between the wireless device and the network device includes a budget for inaccuracy in the position information or a budget for inaccuracy in a Doppler estimate or a timing advance estimate.

The following solutions may be implemented by a BS, e.g., as further disclosed in Section 2 of the present document.

Figure 11D:
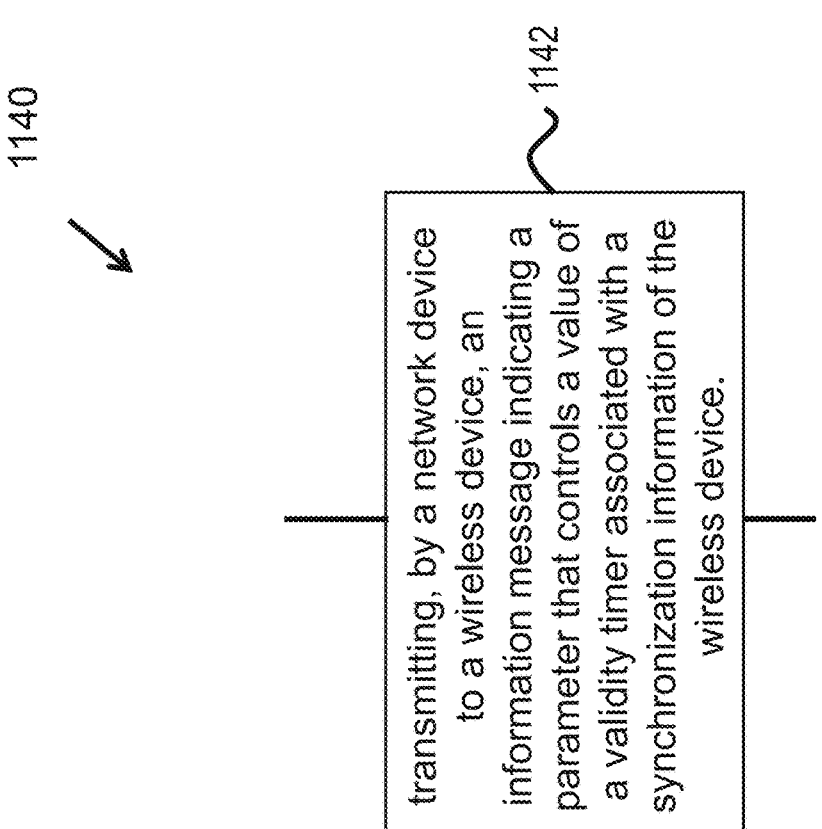

29. A method of wireless communication (e.g., method 1140 depicted in FIG. 11D), comprising: transmitting (1142), by a network device to a wireless device, an information message indicating a parameter that controls a value of a validity timer associated with a synchronization information of the wireless device.

30. The method of solution 29, wherein the parameter indicates an error budget for communication between the wireless device and the network device.

31. The method of solution 29-30, wherein the parameter indicates a probability that the network device and the wireless device will fall out of synchronization.

32. The method of any of solutions 29-31, further including: receiving, from the wireless device, a message indicative of the validity timer.

33. The method of any of solutions 29-32, further including: receiving, from the wireless device, a recommended error budget for communication between the wireless device and the network device; and determining the parameter from the recommended error budget.

34. The method of solution 33, wherein the recommended error budget for communication between the wireless device and the network device includes a budget for inaccuracy in the position information or a budget for inaccuracy in a Doppler estimate or a timing advance estimate.

35. An apparatus for wireless communication comprising a processor that is configured to carry out the method of any of solutions 1 to 34.

36. A non-transitory computer readable medium having code stored thereon, the code when executed by a processor, causing the processor to implement a method recited in any of solutions 1 to 34. It will be appreciated that the present document discloses techniques for information exchange between a wireless device such as a UE and a network device such as a base station regarding synchronization information validity time. The example method may include the following steps.

The UE reports a time value to the network, which can be used to calculate the rest validity time of the assistance information for the uplink synchronization.

The UE reports a time value to network, which can be used to calculate the waiting time after the validity timer expiry. After the waiting time, the UE is regarded as in uplink synchronization.

The UE indicates the happening of assistance information obtaining for the uplink synchronization to network.

The BS indicates the assistance information for GNSS positioning validity time estimation to the UE.

The UE reports GNSS positioning validity time to the BS.

The UE recommend the BS to adjust the error budget sharing.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A method of wireless communication, comprising:
transmitting, by a wireless device to a network device, a first message indicating at least one property of a validity timer associated with synchronization information determined by the wireless device;
    wherein the validity timer indicates a validity time of positioning data of the wireless device;
    wherein the property of the validity timer comprises one or more of: a starting time of the validity timer, an ending time of the validity timer, or a time window after expiry of the validity timer during which the network device is not to schedule a transmission from the wireless device;

wherein the synchronization information comprises one or more of: a rest time of the validity timer, a waiting time after expiry of the validity timer, or an indication of acquiring assistance information from the network device; and wherein the first message includes a time value that indicates the rest time of the validity timer.

2. The method of claim 1, wherein the first message is transmitted after the wireless device determines the synchronization information.

3. The method of claim 1, wherein the synchronization information is determined by the wireless device by positioning data of the wireless device.

4. The method of claim 1, wherein the synchronization information is determined by the wireless device based on a second message comprising assistance information, and wherein the second message, transmitted by the network device, comprises the assistance information including global navigation satellite system, GNSS, positioning information of the wireless device, ephemeris information of the network device, or a common timing advance parameter from the network device.

5. The method of claim 1, wherein the first message comprises indicating a timestamp at which the wireless device acquires assistance information for synchronization with the network device.

6. A method of wireless communication, comprising:

receiving, by a network device from a wireless device, a first message indicating at least one property of a validity timer associated with synchronization information determined by the wireless device;

wherein the validity timer indicates a validity time of positioning data of the wireless device;

wherein the property of the validity timer comprises one or more of: a starting time of the validity timer, an ending time of the validity timer, or a time window after expiry of the validity timer during which the network device is not to schedule a transmission from the wireless device;

wherein the synchronization information comprises one or more of: a rest time of the validity timer, a waiting time after expiry of the validity timer, or an indication of the network device providing assistance information to the wireless device; and wherein the first message includes a time value that indicates the rest time of the validity timer; and determining, by the network device, the property of the validity timer according to the first message.

7. The method of claim 6, wherein the first message is transmitted by the wireless device after the wireless device determines the synchronization information.

8. The method of claim 6, wherein the synchronization information is determined by the wireless device by positioning data of the wireless device.

9. The method of claim 6, further including:

transmitting, by the network device to the wireless device, a second message;

wherein the second message includes assistance information usable by the wireless device to determine the synchronization information, and wherein the assistance information includes global navigation satellite system, GNSS, positioning information of the wireless device, ephemeris information of the network device, or a common timing advance parameter from the network device.

10. The method of claim 6, wherein the first message comprises a timestamp at which the wireless device acquires assistance information for synchronization with the network device.

11. An apparatus for wireless communication comprising a processor that is configured to perform a method, the processor configured to:

transmit, by a wireless device to a network device, a first message indicating at least one property of a validity timer associated with synchronization information determined by the wireless device;

wherein the validity timer indicates a validity time of positioning data of the wireless device;

wherein the property of the validity timer comprises one or more of: a starting time of the validity timer, an ending time of the validity timer, or a time window after expiry of the validity timer during which the network device is not to schedule a transmission from the wireless device;

wherein the synchronization information comprises one or more of: a rest time of the validity timer, a waiting time after expiry of the validity timer, or an indication of acquiring assistance information from the network device; and wherein the first message includes a time value that indicates the rest time of the validity timer.

12. The apparatus of claim 11, wherein the first message is transmitted after the wireless device determines the synchronization information.

13. The apparatus of claim 11, wherein the synchronization information is determined by the wireless device by positioning data of the wireless device.

14. An apparatus for wireless communication comprising a processor that is configured to perform a method, the processor configured to:

receive, by a network device from a wireless device, a first message indicating at least one property of a validity timer associated with synchronization information determined by the wireless device;

wherein the validity timer indicates a validity time of positioning data of the wireless device;

wherein the property of the validity timer comprises one or more of: a starting time of the validity timer, an ending time of the validity timer, or a time window after expiry of the validity timer during which the network device is not to schedule a transmission from the wireless device;

wherein the synchronization information comprises one or more of: a rest time of the validity timer, a waiting time after expiry of the validity timer, or an indication of the network device providing assistance information to the wireless device; and wherein the first message includes a time value that indicates the rest time of the validity timer; and determine, by the network device, the property of the validity timer according to the first message.

15. The apparatus of claim 14, wherein the first message is transmitted by the wireless device after the wireless device determines the synchronization information.

16. The apparatus of claim 14, wherein the synchronization information is determined by the wireless device by positioning data of the wireless device.

* * * * *